UNITED STATES PATENT OFFICE.

GUSTAV WENDT AND JOHANNES LEHMANN, OF BERLIN, GERMANY.

VALERIC ESTERS OF CREOSOTE.

SPECIFICATION forming part of Letters Patent No. 580,630, dated April 13, 1897.

Application filed January 13, 1897. Serial No. 619,092. (No specimens.)

*To all whom it may concern:*

Be it known that we, GUSTAV WENDT and JOHANNES LEHMANN, citizens of the German Empire, residing in Berlin, in the Empire of Germany, have invented certain new and useful Improvements in the Manufacture of Valerianic Esters of Creosote, Guaiacol, &c., of which the following is a specification.

This invention relates to an improved process for the manufacture of the valerianic acid esters of creosote which are to be used as a medicinal substance for the cure of tuberculosis, and which are known, respectively, as "kreosotum valerianicum" and "kreosotum guaiacolum," corresponding to the two most important constituents of wood-tar creosote—namely, creosol and guaiacol.

These valerianic acid esters are distinguished by their special property of being easily absorbed by the human system, and especially by the fact that the heart and nerve tonic property of the valerianic acid is fully preserved in these preparations.

In manufacturing these esters it is sufficient to describe the process of manufacture of the two most important constituents of wood-tar creosote—namely, creosol and guaiacol.

*Manufacture of the creosote valerianate.—* To fifteen parts of creosol and twenty parts of valerianic acid seven parts of phosphorus oxychlorid are added. The mixture is gently heated and boiled first in the water-bath and later on the open flame until the development of hydrochloric acid ceases. It is then washed with a three-per-cent. solution of caustic soda, well shaken with benzene, then separated from the solvent and exsiccated. This ester is obtained in the form of an indifferent slightly-yellow oilish liquid which boils in the vacuum at between 117° and 121° centigrade, while the creosol used in the process distils off *in vacuo* for the greater part between 81° and 85° centigrade.

The ester is easily soluble in alcohol, ether, and benzene, and has an aromatic odor.

*Manufacture of the guaiacol valerianate.—* Five parts of guaiacol are mixed with seven and one-half parts of valeryl chlorid and gently heated and boiled, in the beginning in the water-bath and later on the open flame, until the development of hydrochloric acid ceases. The mixture is then washed with a cold three-per-cent. solution of caustic soda, diluted with benzene, separated from the solvent, and exsiccated. The physical and chemical properties of these esters are practically the same as those of the analogous creosol ester. The boiling-point of both at ordinary atmospheric pressure is about 260° centigrade. Compounds of these esters resulting from the process of esterification of the commercial creosote with valerianic acid begin to distil already at the temperature of 240° centigrade.

The new compound is taken in capsules containing 0.2 grams, beginning with three capsules per day and increasing the quantity gradually to six or seven capsules per day, according to prescription.

Having thus described our invention, we claim as new and desire to secure by Letters Patent—

1. The process herein described of producing valerianic acid esters of creosote, which consists in mixing the main constituents of creosote such as specified with valerianic acid, and boiling the mixture until the reaction is completed, substantially as set forth.

2. The process herein described of producing valerianic acid esters of creosote obtained from wood-tar, which consists in mixing the main constituents of creosote such as specified with valerianic acid and a suitable chlorid, subjecting the mixture to heat up to the boiling-point; and finally washing, separating and drying the same, substantially as set forth.

3. As a new product, the valerianic acid ester of creosote, obtained by treating creosote with valerianic acid, it being an indifferent, slightly-yellow oily liquid, soluble in alcohol, ether and benzene, and boiling at ordinary atmospheric pressure at about 260° centigrade, and in vacuum between 117° and 121° centigrade, substantially as set forth.

In testimony that we claim the foregoing as our invention we have signed our names in presence of two subscribing witnesses.

GUSTAV WENDT.
JOHANNES LEHMANN.

Witnesses:
HENRY HASPER,
W. HAUPT.